(12) United States Patent
Andre et al.

(10) Patent No.: US 7,912,214 B2
(45) Date of Patent: Mar. 22, 2011

(54) METHOD AND SYSTEM FOR GENERATING AND CONTROLLING THE DISTRIBUTION AND USE OF PERSONAL PROMOTION CODES BY TARGETED CUSTOMERS

(75) Inventors: Arnaud Andre, Sollies-Pont (FR); Niklas Sjobring, Nice (FR); David Triscornia, Grasse (FR)

(73) Assignee: Amadeus s.a.s., Biot (FR)

( * ) Notice: Subject to any disclaimer, the term of this patent is extended or adjusted under 35 U.S.C. 154(b) by 913 days.

(21) Appl. No.: 11/878,047

(22) Filed: Jul. 20, 2007

(65) Prior Publication Data

US 2009/0024472 A1   Jan. 22, 2009

(51) Int. Cl.
*H04L 9/00* (2006.01)
(52) U.S. Cl. ............. 380/28; 380/268; 705/14.26
(58) Field of Classification Search .......... 705/5–6, 705/80, 75; 713/165, 179
See application file for complete search history.

(56) References Cited

U.S. PATENT DOCUMENTS

| 5,791,991 | A  | * | 8/1998 | Small ................. 463/41 |
| 7,522,075 | B2 | * | 4/2009 | Mak ................... 341/90 |
| 2002/0034304 | A1 | * | 3/2002 | Yang .................. 380/281 |
| 2006/0007948 | A1 |   | 1/2006 | Cho |
| 2006/0229945 | A1 |   | 10/2006 | Walker et al. |

FOREIGN PATENT DOCUMENTS

| WO | 0198987 | 5/2001 |
| WO | 2004068316 | 1/2004 |

* cited by examiner

*Primary Examiner* — Minh Dinh
*Assistant Examiner* — Venkat Perungavoor
(74) *Attorney, Agent, or Firm* — Young & Thompson

(57) ABSTRACT

A method and a system for generating personal promotion codes from the computing resources of a provider of services. Internal promotion codes including a family ID field and serial ID field of alphanumeric characters are first generated. The internal promotion codes are then encoded into a corresponding series of external promotion codes of alphanumeric characters, which render the internal promotion codes unintelligible. After which the series of external promotion codes is packed into an encrypted file which is forwarded to a client application of the provider of services to have the external promotion codes distributed to its customers. The external promotion codes later submitted to the client application by the customers are further validated by the provider of services. Validation of the external promotion codes submitted by the customers does not require that all generated external promotion codes need to be stored in a database of the provider of services.

9 Claims, 4 Drawing Sheets

METHOD AND SYSTEM FOR GENERATING AND CONTROLLING THE DISTRIBUTION AND USE OF PERSONAL PROMOTION CODES BY TARGETED CUSTOMERS

FIELD OF THE INVENTION

The present invention generally relates to the online generation and use of promotion codes and more particularly relates to a system and method to generate personal promotion codes to better control their distribution and use by targeted customers.

BACKGROUND OF THE INVENTION

With the dramatic expansion of the Internet and development of numerous online commercial applications, promotion codes are often used by various providers of services and goods not only in an attempt to attract more customers but also just to keep the ones they have already dealt with previously. Promotion codes are thus intended to redeem discounts, special offers and rewards to online customers who are expected to enter a promotion code before completing the purchase of a good or booking of a service. This is commonly achieved by having the customer connecting to a server of the provider of services or goods on the Internet through the most spread Internet application, i.e., the world-wide-web or Web, from a personal computer or any other communications device running a standard Web browser or navigator. Then, the online customer can complete any sort of commercial transaction while interactive Web pages are exchanged between customer browser and server running the specific software application of the provider of goods or services. For example, travelers can book trips and travel products online from a travel service provider, e.g., an airline company or an online travel agency (OLTA). By entering a promotion code received through any traditional channel (newspaper, postal mailing), and more often nowadays through electronic mail services (E-mails) and wireless phone and message data services like SMS (short message service of the cellular phone systems) the customer can thus take advantage of a discount on current trip or trips concerned by the promotion.

Promotion codes are basically of two different types: personal or shared. Shared promotion code means that the same code can be used by all interested customers whereas a personal promotion code is unique to each customer. In the travel industry shared promotion codes have been often preferred to promote travel package because of their simplicity of use. In this case a single promotion code needs to be distributed to the customers. This makes the validation of the promotion code straightforward since anyone claiming the benefit of the promotion can get it as long as he/she is able to enter the single promotion code that has been distributed.

Providers of goods and services offering promotions are suffering a lack of revenue when selling the promoted items. Hence, they may not just be interested to sell more items to anybody. Most often, they would like also to control the distribution of the promotions so that they are primarily oriented towards specific groups of customers, e.g., to attract only new customers or to award loyal ones. Control of the distribution and use of shared promotion codes by the issuer are difficult, if not impossible, since they can be used by anyone who becomes aware of them. This problem can only be partially overcome by limiting the overall number of times a shared promotion code can be used (so as to bound the loss of revenue) but there is no way of ensuring that only targeted customers will benefit of it. Thus, if shared promotion codes work well in order to encourage any customers to buy certain kinds of products or services they are not adapted to be used, e.g., as rewards or incentives as part of a loyalty program that would be destined to certain groups of customers.

With personal promotion codes promotion issuers manage to distribute a unique code to each targeted customer through any appropriate distribution channel where targeted customers can be identified, e.g., postal or electronic address of registered customers. Personal promotion codes give a much better control of the diffusion and use of the promotion codes since each identified customer receives a unique promotion code which can only be used once. However, using personal promotion codes does not go without posing some problems too.

First, a large or very large number of codes, ranging from thousands to tens of thousands of codes, must be generated. The generated promotion codes must not only be unique, they must also appear to be random and unintelligible to the customers. Anyone that would manage to get two or more promotion codes must not be able to find easily a way of guessing what would be other valid codes for the promotion. This must be combined however with the fact that code must not be too long or to difficult to enter by the customer who has received it. Especially, code to enter must only be comprised of alphanumeric characters easy to read and type on a keyboard. Hence, the known cryptographic methods which permit to generate, e.g., one-way hash functions like MD5 (message digest function 5) are not convenient because they need to work on data blocks and key size too large for generating short promotion codes and are not restricted to alphanumeric characters.

Then, all generated promotion codes must be stored in a database in order to allow code validation each time a customer claims the benefit of a promotion. Storing a large or very large number of promotion codes in the database takes a lot of memory resources. Moreover, costly database calls, including queries of alphanumeric fields, have to be made to validate that promotion code actually exists in the database. This must be done in spite of the fact that, most often, only a small percentage of all the valid promotion codes is actually used. Hence, most of the promotion codes are worthlessly stored while always penalizing the successful searches in database.

It is therefore a broad object of the invention to overcome the difficulties, here above discussed, of issuing and storing a large number of personal promotion codes in a database in order to validate the promotion codes submitted by customers.

It is a specific object of the invention to minimize the resources needed to handle promotion codes in the database by not requiring having to store in it the complete list of generated promotion codes but only those that have been actually used by customers.

It is also an object of the invention to allow validating promotion codes without requiring numerous costly database calls.

It is a further object of the invention to allow that used promotion codes be stored as integers to avoid querying alphanumeric fields.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes a method and a system for generating personal promotion codes from the computing resources of a provider of services. Internal promotion codes including a family ID field and a serial ID field comprised of alphanumeric characters are first generated. The internal promotion codes are then encoded into a corresponding series of external promotion codes also comprised of alphanumeric characters, which render the internal promotion codes unintelligible. After which the series of external promotion codes is packed into an encrypted file which is forwarded to a client application of the provider of services to have the external promotion codes distributed to its customers. The external promotion codes later submitted to the client application by the customers are further validated by the provider of services. Validation of the external promotion codes submitted by the customers does not require that all generated external promotion codes need to be stored in a database of the provider of services.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
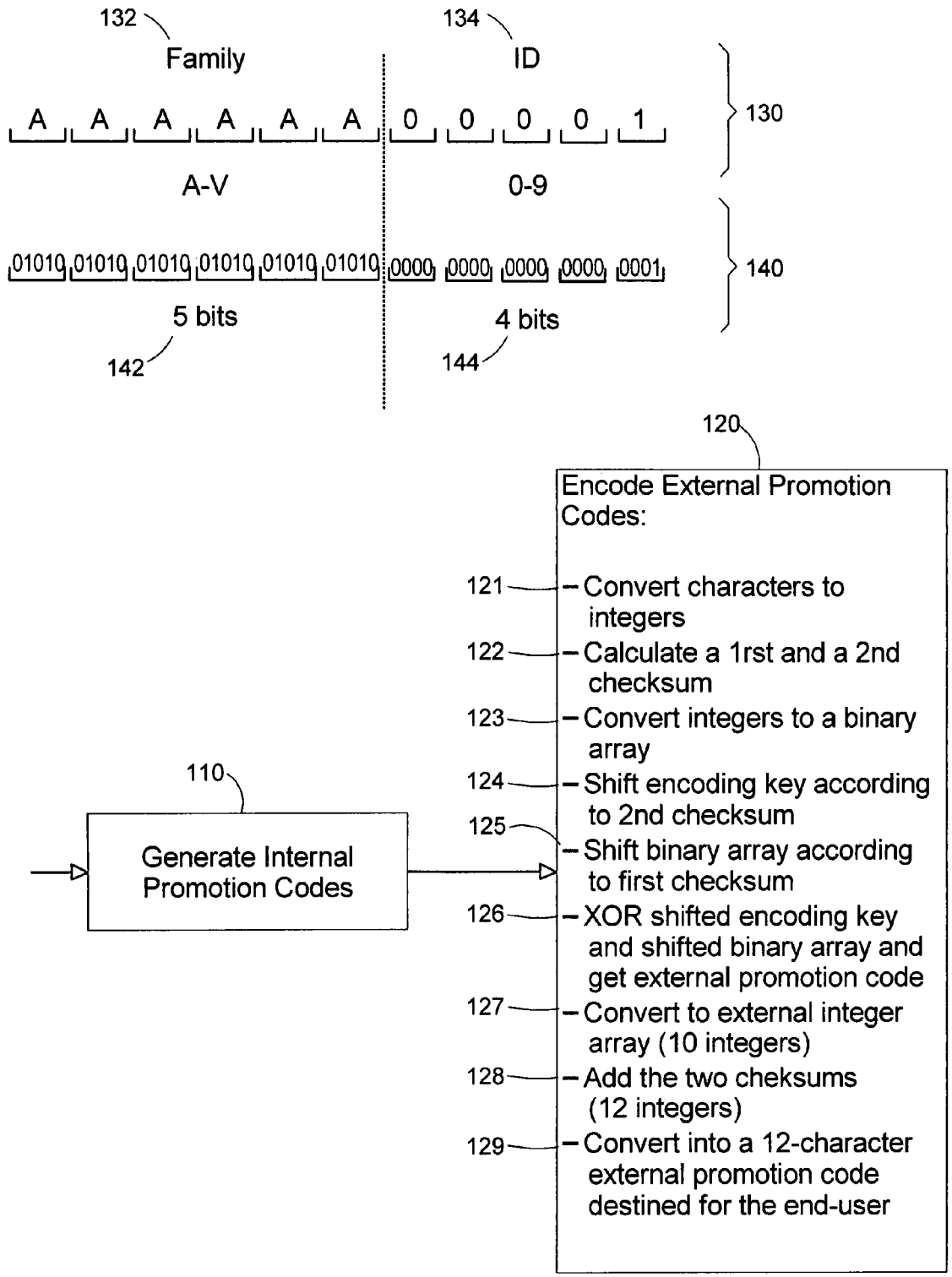
FIG. 1 describes the algorithm to generate internal promotion codes and to encode from them a large number of unique external promotion codes which appear to be unintelligible.

FIG. 1 describes the algorithm to generate internal promotion codes and to encode from them a large number of unique external promotion codes which appear to be unintelligible. Reverse use of the algorithm allows decoding the promotion codes entered by the end-users of a system according to the invention in order to verify their validity without needing to check if submitted promotion codes belong to the list of generated external promotion codes.

The creation of promotion codes is performed in two main steps: a generation step and an encoding step. First, an internal promotion code is generated (110). Internal promotion code follows a pre-defined predictable grammar. Then, from the internal promotion code, an external promotion code is encoded (120) which eventually appears completely random to the end-user.

While FIG. 1 illustrates the steps of the algorithm according to the invention through a particular example including an 11-character internal promotion code those skilled in the art will recognize that other code structures can be used as well while practicing the invention. Especially, the number of characters and the structure of the code can be different of the ones used to illustrate the invention provided a predictable grammar can be applied to define the internal codes so that they can be easily generated and syntax validated.

Therefore, with the particular example chosen to illustrate the invention the internal promotion codes are comprised of 11 characters (130) having the following simple structure:

The first six characters (132) are reserved to specify a family promotion code. The allowed characters for the family code portion are in the range A-V including only capital letters. This gives 22 possible values for each valid character. Hence, a total of $22^6$ (22 to the power of 6, i.e.: 113,379,904) different promotion families are possibly definable with this exemplary structure.

The remaining five characters (134) are reserved to specify a serial ID within each family of promotion codes. The allowed characters for the ID portion of the code are here limited to the numerals 0-9 giving however possibly 100,000 different ID's per promotion family.

A straightforward example of an internal promotion code is thus:

"AAAAAA00001".

Once internal promotion codes have been generated the encoding into external promotion codes (120) is achieved through the execution of the following encoding sub-steps:

An internal promotion code is first converted from a string of characters to an array of integers (121). Since the internal alphabet consists of a total of 32 characters (A-V, 0-9) the integer values 0-31 are sufficient to describe all the used characters. Integer values 0-9 represent the numbers 0-9 and the values 10-31 represent the range of A-V characters. For example, the above exemplary code "AAAAAA00001" would be converted into the integer array:

{10, 10, 10, 10, 10, 10, 0, 0, 0, 0, 1}.

Two different checksums are then calculated from the integer array (122):

The first checksum is simply the sum, modulo 32, of all integer values from the integer array. This gives 32 possible values for the first checksum (0-31). For example, for the here above integer array the first checksum value is 29 (i.e.: 10+10+10+10+10+10+1=61 modulo 32).

The second checksum is calculated by first multiplying all the even positions (0, 2, 4, 6, 8 and 10) in the integer array by 2 and adding them to the checksum. Then all the odd positions (1, 3, 5, 7 and 9) are multiplied by 3 and added to the checksum. The second checksum is calculated modulo 32 too. Hence, it can also take 32 possible values (0-31).

As this is further explained hereafter the two checksums are used as input parameters in the algorithm and are also added, at specific positions, in the external promotion code in order to retrieve these checksums when decoding is performed.

The next sub-step (123) is aimed at converting the integer array into a binary array (140). To this end, the 6 alphabetic characters (integer values 10-31) for the family are coded on 5 bits (142) while the 5 numeric characters (integer values 0-9) need only to be coded on 4 bits (144). The binary array is thus comprised of a total of 6×5+5×4=50 bits.

The encoding step (120) makes also use of a 50-bit randomly generated encoding key which consists of 10 characters including, like the internal promotion code, alphabetic characters in the range A-V and numerals in the range 0-9. The key is also converted into a binary array. All characters and numerals are however coded on 5 bits so that the number of bits of the key is made equal to the one of the internal promotion code, i.e.: 10×5=50 bits. At sub-step (124) the encoding key is shifted of a number of positions (0-31) corresponding to the second checksum calculated as explained above. Shifts are done from left to right so that the bits that overflow the binary array to the right are replacing the ones shifted from the left.

Similarly, the first checksum is used to shift the internal promotion code binary array (125).

Once key and internal codes have been shifted they are XOR'ed (i.e., a bit-wise addition modulo 2) at next sub-step (126) to obtain the binary form of the randomized external promotion code.

The above binary external promotion code is then converted to an integer array of 10 integers at step (127). The 50 bits then represent ten integer values (5 bits per integer) each with a possibility of $2^5=32$ different values (0-31).

The first and the second checksum are then inserted into the external promotion code integer array at fixed positions so that they can be retrieved for decoding. At this step (128) the integer array is thus comprised of 12 integers.

Finally, the 12 integers in the array are converted into a 12-character string in which integer values 0-9 represent the numbers 0-9 and 10-31 represents the A-V characters as with the internal code previously discussed. The 12-character string is the final external promotion code destined to be delivered to the end-user. Hence, the external promotion code appears to be completely uncorrelated with the internal promotion code from which it is issued and sequences of successive internal promotion codes are indeed randomized.

For example the internal promotion code "AAAAAA00001" is encoded to the external promotion code "971S90UOV2DF" for a given key. With the same key, the following internal code "AAAAAA00002" is encoded to the external code "C4FRNPVN9GTR". Thus, as expected, a single bit change of the internal promotion code (ID field changing from 1 to 2) is sufficient to produce dramatic changes in the corresponding external promotion code delivered to the end-user.

The decoding process of an external promotion code is the exact reverse process of the encoding:

The 12-character external promotion code string is converted to 12 integers ranging from 0 to 31.

The two checksums are retrieved and extracted from the external integer array after which array is comprised of 10 integers.

The 10-integer array is converted into a 50-bit binary array (5 bits per integer).

The binary form of the random key that was used for encoding is shifted according to the value of the second checksum.

The external integer array is backward shifted according to the value of the first extracted checksum and XOR'ed with the above shifted encoding/decoding key bit array. Result is the internal promotion code binary array.

The internal binary array is then converted to an integer array. The first 30 bits represent the family coded on six 5-bit characters. The last 20 bits represents the ID of the promotion coded on five 4-bit characters.

Finally, the integer array is converted back to an 11-character string which is the decoded internal promotion code.

Figure 2:
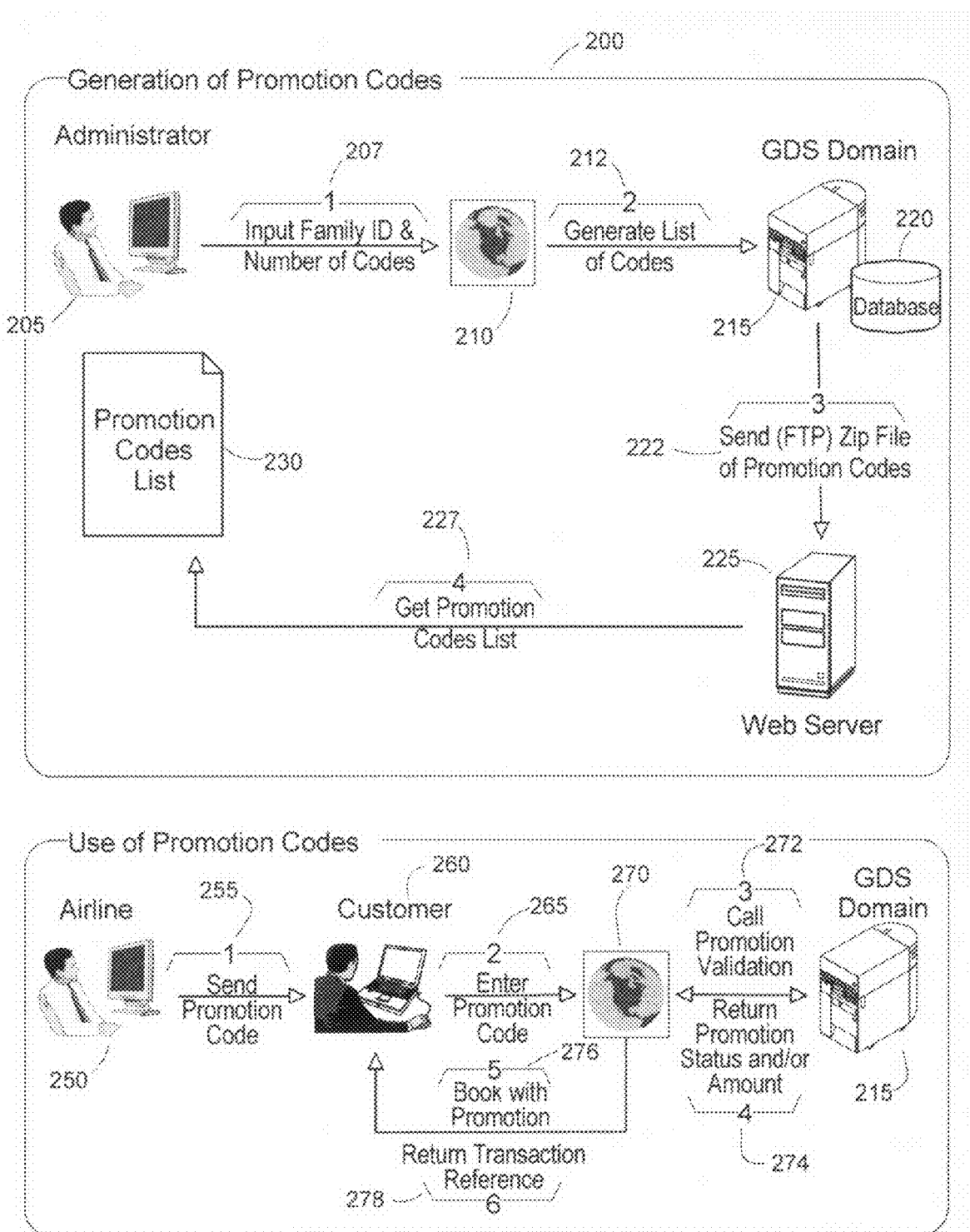
FIG. 2 describes the typical environment in which the invention is best operated.

FIG. 2 describes the typical environment in which the invention is best operated.

Generation of a family of promotion codes (200) is performed by an administrator (205) of the system which has access through any combination of private and public networks, including the Internet (210), to computing resources (215); e.g., those of a GDS (global distribution system) such as AMADEUS a world-wide service provider for the travel industry. The administrator defines the family code and the number of codes that will be offered to the customers for the promotion (207). Generation of the promotion codes (212) is achieved from GDS computing resources (215) which generally carry out all the software standard methods and techniques necessary to achieve this and also enable the communications means with the remote administrator (205) and other components of the system. Especially, computing resources are) enabling all the protocols and applications of the Internet including the standard most used applications like the world-wide-web or WWW and the file transfer protocol or FTP. GDS resources have access to databases including the one to store the characteristics of the promotions offered to the customers (220). Once calculated the promotion codes are forwarded (222) to an external server, typically a Web server (225), partially or completely dedicated to a GDS client, e.g., an airline company. Then, GDS client server gets and holds (227) the exhaustive list of encoded promotion codes (230) destined to GDS client customers, i.e., airline travelers in this example.

Once generated promotion codes can be sent (255) to customers of the provider of services or goods that has initiated the promotion, e.g., to a selection of travelers (260) known by the airline company (250) mentioned above. Although this can be achieved in many ways, in a networking environment, electronic distribution of the promotion codes is generally preferred. A customer that wants to take advantage of the received promotion code must then connect to the site (270) of the service provider, i.e., the airline company in this example. Connection to the site is performed from any appropriate communication device capable of communicating with a Web server. Most often this is done from a personal computer (PC) running a standard Web browser application capable of receiving and responding to interactive Web pages. Thus, the customer enters the received promotion (265) code in order to book a trip and, in general, to buy a service or a good from the provider that has initiated the promotion. The entered promotion code is then validated by the GDS in this example (272). This is typically achieved from a booking application running on the GDS computing resources mentioned above (215). As already mentioned, and further discussed in FIG. 4, validation is obtained by decoding the external promotion code provided by the customer and checking if it indeed conforms to the expected structure discussed in FIG. 1. Hence, there is no need to store in GDS database (220) the long list of possible external promotion codes that have been generated. Only, those that are actually used by the customers need to be stored.

If the external promotion code is indeed validated the promotion status (promotion may have expired, is not valid for the time period or destinations chosen by the customer, etc.) and/or promotion amount are returned (274) so that the customer, if satisfied, can actually proceed with the booking (276) in which case some sort of record and transaction reference is also provided (278).

Figure 3:
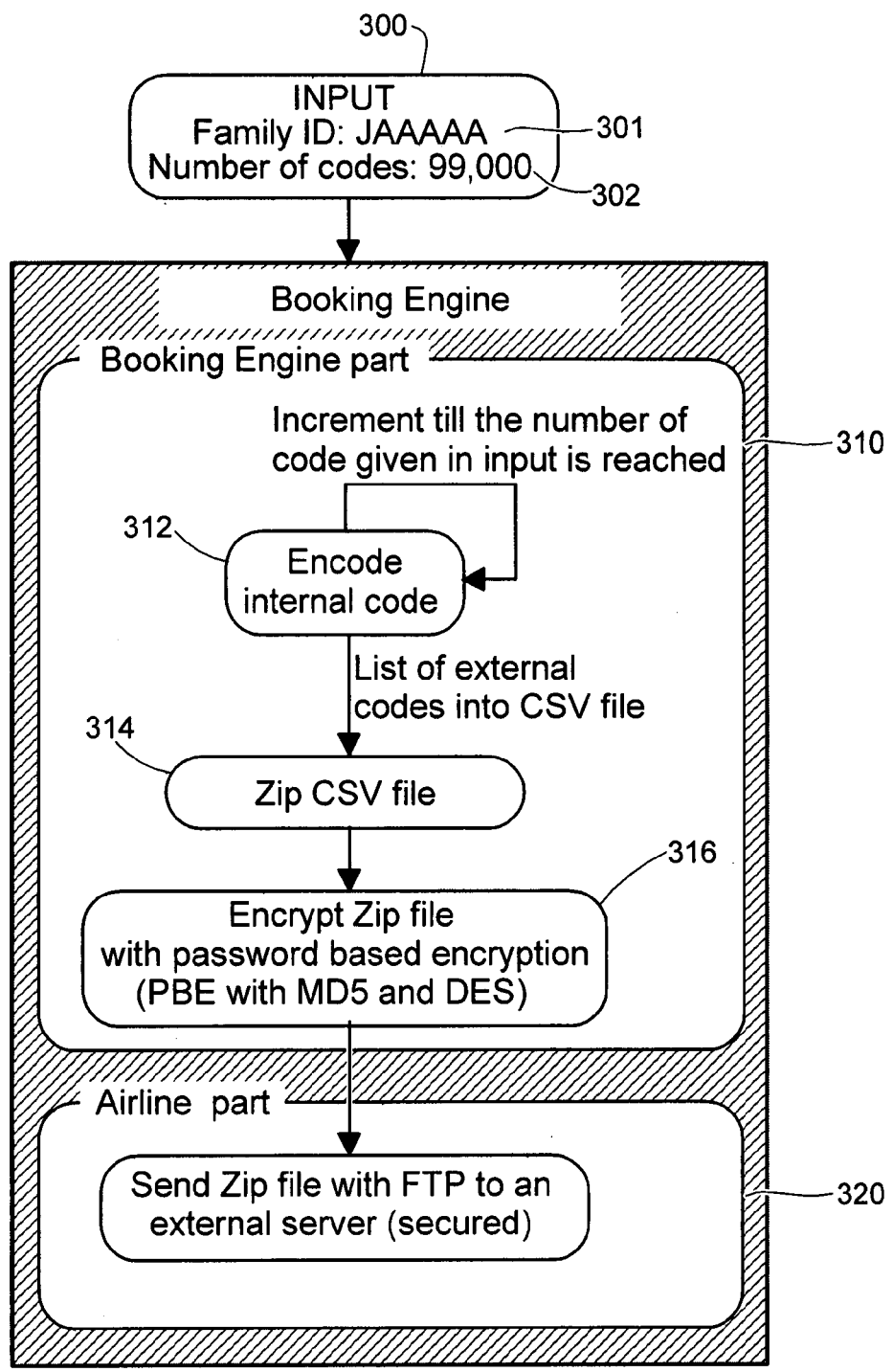
FIG. 3 further describes the steps of the method for generating the external promotion codes.

FIG. 3 further describes the steps of the method for generating the external promotion codes.

As already discussed in FIG. 2, an administrator of the system can trigger the creation of a family of promotion codes (300) by entering a family ID name (301) and a number of codes to generate (302) conforming to the internal code structure described in FIG. 1. The generation of codes is actually handled by a corresponding software application running on the computing resources of a service provider, e.g., a GDS also shown in FIG. 2. Typically, in this case, a system according to the invention is part of a booking engine (310); i.e., any travel software application aimed at booking travel transactions like performing trip bookings for the end-customers of the airline companies, clients of the GDS. Then, as explained in details in FIG. 1, on the basis of the family ID name and number of codes to generate specified by the administrator, a corresponding list of external codes is encoded (312).

A list of external codes, generally comprising thousands of codes, is then put in a comma separated values (CSV) file which is compressed (zipped) with standard techniques (314).

The zipped file is further encrypted (316), on the basis of a password, employing methods and techniques known in the art such as the well-known DES (data encryption standard) and MD5 (message digest function 5) already mentioned in the background section.

Once encrypted, the file is sent (320) to the external Web server (225) discussed in FIG. 2. The server is preferably a secured server. Then, the promotion codes become useable by the client of the service provider that has initiated the promotion; i.e., the airline company (250) with the example used to illustrate the invention.

Figure 4:
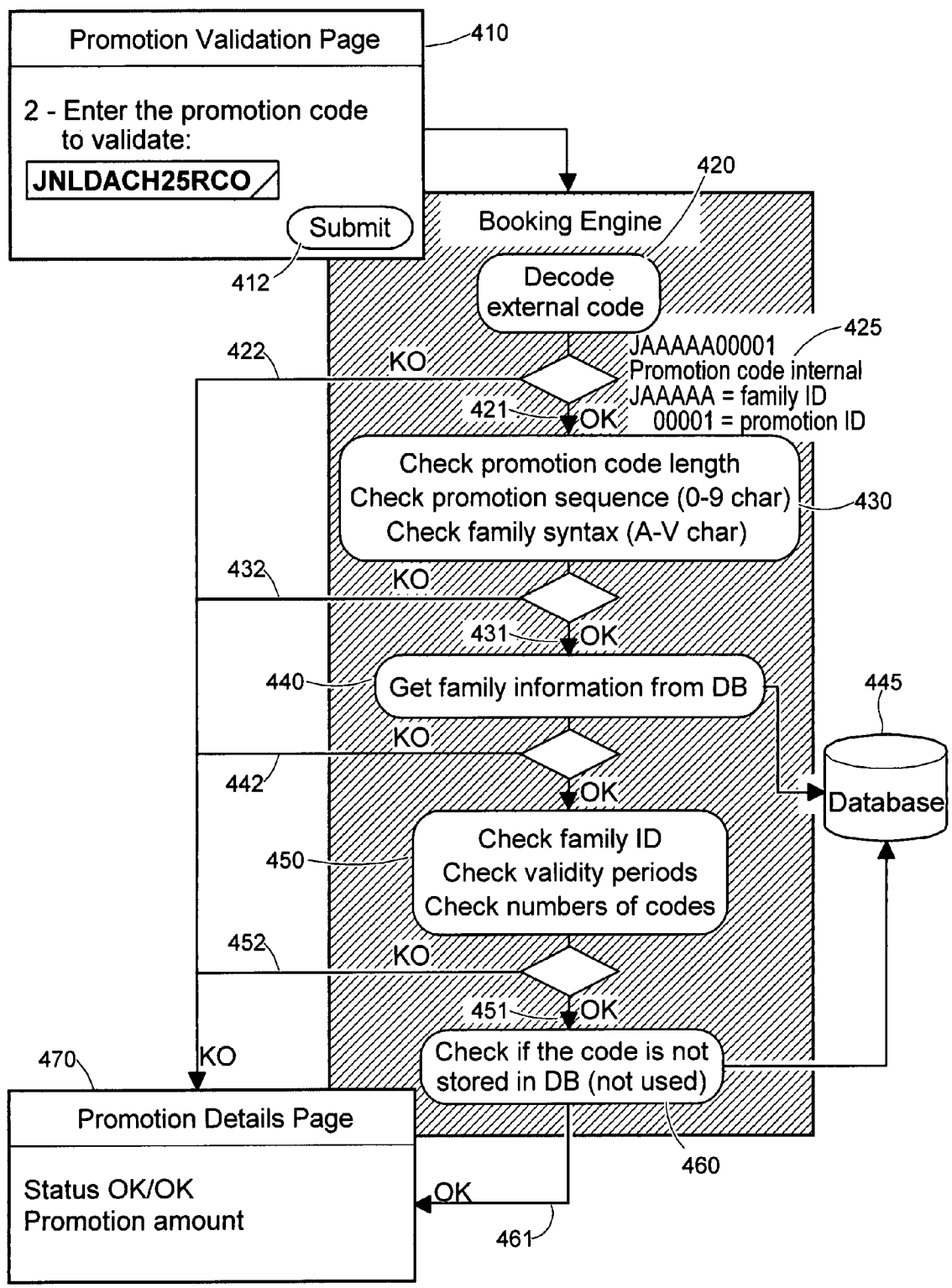
FIG. 4 shows the steps of the method for validating the external promotion codes.

FIG. 4 shows the steps of the method for validating the external promotion codes.

As discussed in FIG. 2 whenever an external promotion code is entered by a customer it must be validated (272). The promotion code is entered from an interactive Web page (410) displayed by a Web browser on a PC screen or communications device used by customer. The promotion code is then submitted (412) to the corresponding software application, e.g., the booking engine mentioned in FIG. 3 where the external promotion code is decoded as explained in FIG. 1. The decoding allows restoring the internal promotion from which the external code was issued. If the structure of the restored internal code conforms to the definition of an internal promotion code, including a family ID and serial promotion ID (425), checking can proceed (421). If not, the validation of submitted external promotion code fails (422) and corresponding status is returned to the customer in a Web page (470). If the first step is successful the restored code is further checked at step (430) to verify the promotion code length, the promotion sequence field (must be comprised of characters in the range 0-9) and the family syntax (A-V characters). The validation can proceed (431) if the check above is successful. Otherwise, the validation fails (432). Next step of the validation is aimed at getting the promotion family information stored in the database (445) already discussed in FIG. 2. For each family of promotions that have been initiated by service providers the characteristics of the promotion are stored in the database. Promotion characteristics include such things as the family ID, the validity period of the promotion, the number of codes, etc. If corresponding records can indeed be retrieved from the database on the basis of the restored internal code checking of the promotion characteristics can be further performed at next step (450) otherwise the validation fails (442). If the check of the promotion characteristics is successful (451) last step of the validation consists in checking that restored code is not already present in database (460). If present this would indicate that code was already used by a customer (only used promotion codes are stored in database). Hence, validation fails if the check of the promotion characteristics is unsuccessful (452) or if the code is already present in database. Otherwise, the validation ends successfully (461), the corresponding status can be returned to the customer along with the promotion amount (470) and the database updated accordingly (the promotion code is added to the list of used codes).

What is claimed is:

1. A method for generating unique personal promotion codes from computing resources of a provider of services, the method comprising the steps of:
    generating internal promotion codes including a family ID field and a serial ID field comprised of alphanumeric characters;
    encoding the internal promotion codes into a corresponding series of external promotion codes, comprised of alphanumeric characters, to render the internal promotion codes unintelligible,
    wherein the step of encoding each internal promotion code into a corresponding external promotion code includes the steps of:
    converting the alphanumeric characters of the internal promotion codes to integers;
    calculating a first and a second checksum;
    converting the integers to a binary array;
    shifting a binary encoding key according to the second checksum;
    shifting the binary array according to the first checksum;
    xoring (bitwise adding modulo 2) the shifted binary encoded key and the shifted binary array;
    converting back the xored binary array to integers;
    inserting the first checksum and the second checksum into the xored array of integers;
    converting back the inserted array of integers to alphanumeric characters;
    thus, obtaining the corresponding external promotion code.

2. The method of claim 1 wherein the steps of the method are backward executed to decode the external promotion code and obtain the corresponding internal promotion code, including:
    replacing the inserting step by the step of extracting a first and a second checksum and wherein the calculating step is skipped;
    replacing the step of shifting the binary array by the step of shifting backward the binary array according to the extracted first checksum.

3. The method of claim 1 comprising the further steps of:
    packing the series of external promotion codes into an encrypted file;
    forwarding the encrypted file to a client application of the provider of services to have the series of external promotion codes distributed to customers of the client application.

4. The method of claim 3 wherein the external promotion codes submitted to the client application by the customers are further validated by the provider of services on the basis of their structure.

5. The method of claim 2 wherein the validation of the submitted external promotion codes is successful when all of the following steps succeed:
    decoding of the external promotion code;
    checking of the decoded internal promotion code against a predefined code syntax;
    checking of the decoded internal promotion code against family information fetched from a database of promotions;
    checking that decoded internal promotion is not already present in database;
    otherwise, validation of the submitted external promotion codes fails.

6. The method of claim 5 including the further step of storing in the database the validated promotion codes.

7. The method of claim 1 wherein the internal promotion code includes a family ID field comprising alphabetic characters in the range A-V and a serial ID field comprising numeral characters in the range 0-9.

8. A non-transitory computer readable storage medium, comprising computer readable code means for causing at least one computer to operate the method of generating and validating personal promotion codes according to claim 1.

9. The method of claim 4 wherein the validation of the submitted external promotion codes is successful when all of the following steps succeed:
   decoding of the external promotion code;
   checking of the decoded internal promotion code against a predefined code syntax;
   checking of the decoded internal promotion code against family information fetched from a database of promotions;
   checking that decoded internal promotion is not already present in database;
   otherwise, validation of the submitted external promotion codes fails.

* * * * *